US010951409B2

United States Patent
Konda et al.

(10) Patent No.: US 10,951,409 B2
(45) Date of Patent: Mar. 16, 2021

(54) METHODS AND SYSTEMS FOR VERIFYING TOKEN-BASED ACTIONS ON DISTRIBUTED LEDGER-BASED NETWORKS THROUGH THE USE OF ZERO-KNOWLEDGE PROOFS

(71) Applicant: EYGS LLP, London (GB)

(72) Inventors: Chaitanya Reddy Konda, London (GB); Duncan James Westland, Addlestone (GB); Paul Richard Brody, Woodside, CA (US)

(*) Notice: Subject to any disclaimer, the term of this patent is extended or adjusted under 35 U.S.C. 154(b) by 0 days.

(21) Appl. No.: 16/659,335

(22) Filed: Oct. 21, 2019

(65) Prior Publication Data

US 2020/0127833 A1    Apr. 23, 2020

Related U.S. Application Data

(60) Provisional application No. 62/748,002, filed on Oct. 19, 2018.

(51) Int. Cl.
*H04L 9/32* (2006.01)
*H04L 9/08* (2006.01)
(Continued)

(52) U.S. Cl.
CPC ........ *H04L 9/3221* (2013.01); *G06F 16/9027* (2019.01); *H04L 9/0637* (2013.01);
(Continued)

(58) Field of Classification Search
CPC ....... H04L 9/06; H04L 9/0637; H04L 9/0643; H04L 9/32; H04L 9/3218; H04L 9/3221;
(Continued)

(56) References Cited

U.S. PATENT DOCUMENTS 9,397,985 B1    7/2016  Seger, II et al.
9,608,829 B2    3/2017  Spanos et al.
(Continued)

FOREIGN PATENT DOCUMENTS

CN    107274184 A    10/2017
CN    106598824 B    11/2018
(Continued)

OTHER PUBLICATIONS

Mark Clifton, Understanding Merkle Trees—Why use them, who uses them, and how to use them, 2017, codeproject.com, pp. 1-31 (Year: 2017).*

(Continued)

*Primary Examiner* — Robert B Leung
*Assistant Examiner* — Adrian Stoica
(74) *Attorney, Agent, or Firm* — Cooley LLP

(57) ABSTRACT

In an embodiment, a method comprises receiving a request that is configured to cause a transfer of a combined asset from a sender to a recipient, the combined asset including a first asset and a second asset. The method includes generating and sending to a self-executing code segment on a distributed ledger-based network (DLN) a zero-knowledge proof (ZKP) that a plurality of leaf nodes of a hierarchical tree structure representing the combined asset includes the plurality of leaf nodes of the hierarchical tree structure representing the first asset and the plurality of leaf nodes of the hierarchical tree structure representing the second asset. The method also includes receiving, in response to verification of the ZKP by the self-executing code segment, a confirmation confirming a representation of the combined asset on the DLN by a third token associated with the root node of the third hierarchical tree structure.

20 Claims, 6 Drawing Sheets

(51) Int. Cl.
  *H04L 9/30* (2006.01)
  *G06F 16/901* (2019.01)
  *H04L 9/06* (2006.01)
(52) U.S. Cl.
  CPC .......... *H04L 9/0643* (2013.01); *H04L 9/0825* (2013.01); *H04L 9/30* (2013.01); *H04L 9/3213* (2013.01); *H04L 9/3218* (2013.01); *H04L 2209/38* (2013.01)
(58) Field of Classification Search
  CPC ... H04L 9/3236; H04L 9/3239; H04L 16/137; H04L 16/90; H04L 16/901; H04L 16/9014; H04L 16/9027; H04L 2209/38; H04L 2209/56; H04L 9/0825; H04L 9/30; H04L 9/3213; G06F 16/90; G06F 16/901; G06F 16/9014; G06F 16/9024; G06F 16/9027
  See application file for complete search history.

(56) References Cited

U.S. PATENT DOCUMENTS

| | | | |
|---|---|---|---|
| 9,785,369 | B1 | 10/2017 | Ateniese et al. |
| 9,794,074 | B2 | 10/2017 | Toll et al. |
| 9,870,508 | B1 | 1/2018 | Hodgson et al. |
| 9,881,176 | B2 | 1/2018 | Goldfarb et al. |
| 9,906,513 | B2 | 2/2018 | Wuehler |
| 9,942,231 | B1 | 4/2018 | Laucius et al. |
| 9,948,467 | B2 | 4/2018 | King |
| 9,959,065 | B2 | 5/2018 | Ateniese et al. |
| 10,026,118 | B2 | 7/2018 | Castinado et al. |
| 2016/0260169 | A1 | 9/2016 | Arnold et al. |
| 2016/0358165 | A1 | 12/2016 | Maxwell |
| 2017/0091750 | A1 | 3/2017 | Maim |
| 2017/0163733 | A1 | 6/2017 | Grefen et al. |
| 2017/0278100 | A1 | 9/2017 | Kraemer et al. |
| 2017/0293503 | A1 | 10/2017 | Curtis |
| 2017/0346639 | A1 | 11/2017 | Muftic |
| 2018/0048461 | A1 | 2/2018 | Jutla et al. |
| 2018/0101701 | A1 | 4/2018 | Barinov et al. |
| 2018/0139043 | A1 | 5/2018 | Jayachandran et al. |
| 2018/0165131 | A1 | 6/2018 | O'Hare et al. |
| 2018/0189753 | A1 | 7/2018 | Konda et al. |
| 2018/0218176 | A1 | 8/2018 | Voorhees et al. |
| 2018/0294967 | A1 | 10/2018 | Roberts et al. |
| 2019/0012660 | A1* | 1/2019 | Masters ........... G06Q 20/38215 |
| 2019/0012662 | A1 | 1/2019 | Krellenstein et al. |
| 2019/0034923 | A1 | 1/2019 | Greco et al. |
| 2019/0165943 | A1* | 5/2019 | Chari .................... H04L 9/3221 |
| 2019/0238525 | A1* | 8/2019 | Padmanabhan ..... H04L 63/0428 |
| 2019/0286102 | A1* | 9/2019 | Carbone ................ B33Y 50/02 |
| 2020/0059361 | A1 | 2/2020 | Konda et al. |
| 2020/0059362 | A1 | 2/2020 | Brody et al. |
| 2020/0059364 | A1 | 2/2020 | Konda et al. |
| 2020/0127834 | A1 | 4/2020 | Westland |
| 2020/0327112 | A1 | 10/2020 | Glickshtein |
| 2020/0328890 | A1 | 10/2020 | Connor |
| 2020/0328894 | A1 | 10/2020 | Baker |
| 2020/0328899 | A1 | 10/2020 | Glickshtein |

FOREIGN PATENT DOCUMENTS

| | | |
|---|---|---|
| CN | 109359948 A | 2/2019 |
| WO | WO 2017/187395 | 11/2017 |
| WO | WO 2018/007828 | 1/2018 |
| WO | WO 2018/028777 | 2/2018 |
| WO | WO 2018/144302 | 8/2018 |

OTHER PUBLICATIONS

International Search Report and Written Opinion for International Application No. PCT/US2019/057262, dated Jan. 24, 2020, 10 pages.

Andreev, O., "Hidden in Plain Sight: Transacting Privately on a Blockchain. Introducing Confidential Assets in the Chain Protocol," [Online], Retrieved from the Internet: <URL: https://blog.chain.com/hidden-in-plain-sight-transacting-privately-on-a-blockchain-835ab7 . . . ], Retrieved on Aug. 27, 2018, 11 pages.

Parno, B. et al., "Pinocchio: Nearly practical verifiable computation," S&P (2013), 16 pages.

Groth, J. et al., "Snarky signatures: Minimal signatures of knowledge from simulation-extractable SNARKs," In: Katz, J., Shacham, H. (eds.) CRYPTO 2017. LNCS, vol. 10402, pp. 581-612. Springer, Cham (2017).

Ben-Sasson, E. et al., "Scalable, transparent, and post-quantum secure computational integrity," Cryptology ePrint Archive, Report 2018/046 (2018), 83 pages.

Wu, H., "DIZK: Distributed zero-knowledge proof systems," In USENIX Security (2018), 35 pages.

Orcutt, M., "A tool developed for blockchains makes it possible to carry out a digital transaction without revealing any more Information than absolutely necessary," MIT Technology Review 121.2: 45(1). Technology Review, Inc. (Mar. 2018-Apr. 2018).

Zhang, Y. et al., "Z-Channel: Scalable and efficient scheme in zerocash," 2017, [Online], Retrieved from the Internet: https://eprint.iacr.org/2017/684, pp. 1-39.

International Search Report and Written Opinion for International Application No. PCT/US2019/046532, dated Dec. 2, 2019, 9 pages.

International Search Report and Written Opinion for International Application No. PCT/US2019/046808, dated Dec. 2, 2019, 10 pages.

Kosba, A. et al., "Hawk: The Blockchain Model of Cryptography and Privacy-Preserving Smart Contracts," 2016 IEEE Symposium on Security and Privacy, May 2016, pp. 839-858.

Office Action for U.S. Appl. No. 16/283,452, dated Nov. 6, 2019, 34 pages.

Office Action for U.S. Appl. No. 16/283,452, dated Jul. 10, 2019, 31 pages.

Narula, N. et al., "zkLedger: Privacy-preserving auditing for distributed ledgers," Proceedings of the 15th USENIX Symposium on Networked Systems Design and Implementation (NSDI '18), Apr. 9-11, 2018, Renton, WA, USA, 17 pages.

International Search Report and Written Opinion for International Application No. PCT/US2019/057246, dated Feb. 4, 2020, 9 pages.

Lee, C. H. et al., "Implementation of IoT system using blockchain with authentication and data protection," 2018 International Conference on Information Networking (ICOIN), IEEE, Jan. 10, 2018, pp. 936-940.

Menezes, A. et al., "Key Management Techniques," Chapter 13 in Handbook of Applied Cryptography, CRC Press, Boca Raton, FL, (1996), pp. 543-590.

International Search Report and Written Opinion for International Application No. PCT/EP2020/060629, dated Jun. 25, 2020, 10 pages.

International Search Report and Written Opinion for International Application No. PCT/EP2020/060610, dated Jul. 27, 2020, 17 pages.

Invitation to Pay Additional Fees and Partial International Search Report for International Application No. PCT/EP2020/060623, dated Jun. 17, 2020, 12 pages.

Bunz, B. et al., "Zether: Towards privacy in a smart contract world," IACR, International Association for Cryptologic Research, vol. 20190226:031535, Feb. 20, 2019, Retrieved from the Internet: <URL:http://eprint.iacr.org/2019/191.pdf>, Retrieved on Feb. 20, 2019, 49 pages.

Dinh, T. T. A. et al., "Blockbench: A framework for analyzing private blockchains," [Online], Retrieved from the Internet: <URL: https://arxiv.org/abs/1703.04057>arXiv:1703.04057v1, Mar. 12, 2017, 16 pages.

Khalil, R. et al., "NOCUST—A securely scalable commit-chain," Feb. 15, 2019, Retrieved from the Internet: <URL:https://eprint.iacr.org/eprint-bin/getfile.plentry=2018/642&version=20190215:182502&file=642.pdf>, Retrieved on Mar. 10, 2020, 27 pages.

(56) References Cited

OTHER PUBLICATIONS

Jiang, Y. et al., "A privacy-preserving e-commerce system based on the blockchain technology," 2019 IEEE International Workshop on Blockchain Oriented Software Engineering (IWBOSE 2019), Hangzhou, China, Feb. 29, 2019, pp. 50-55.
International Search Report and Written Opinion for International Application No. PCT/EP20201060623, dated Aug. 7, 2020, 16 pages.
International Search Report and Written Opinion for International Application No. PCT/EP2020/060626, dated Sep. 3, 2020, 12 pages.
Magazzeni, D. et al., "Validation and verification of smart contracts: A research agenda," Computer, vol. 50, No. 9, Sep. 2017, pp. 50-57.

* cited by examiner

METHODS AND SYSTEMS FOR VERIFYING TOKEN-BASED ACTIONS ON DISTRIBUTED LEDGER-BASED NETWORKS THROUGH THE USE OF ZERO-KNOWLEDGE PROOFS

CROSS-REFERENCE TO RELATED PATENT APPLICATION

This application claims priority to and the benefit of U.S. Provisional Application No. 62/748,002, filed Oct. 19, 2018, entitled "Methods and Systems of ZKP-Based Secure Private Enterprise Transactions on Public Networks," which is incorporated herein by reference in its entirety.

This application is also related to U.S. Provisional Application No. 62/719,636, filed Aug. 18, 2018, entitled "Methods and Systems of ZKP-Based Secure PE Transactions on Public Networks, U.S. Non-Provisional application Ser. No. 16/283,452, filed Feb. 22, 2019, entitled "Methods and Systems for Enhancing Privacy and Efficiency on Distributed Ledger-Based Networks" and U.S. Non-Provisional application Ser. No. 16/542,701, filed Aug. 16, 2019, entitled "Methods and Systems for Implementing Zero-Knowledge Proofs in Transferring Partitioned Tokens on Distributed Ledger-Based Networks," all of which are incorporated herein by reference in their entirety.

FIELD OF THE DISCLOSURE

This disclosure relates to the use of tokens and the verification of certain token-based actions on distributed ledger-based networks (DLNs) using zero-knowledge proofs (ZKPs).

BACKGROUND

Organizations can use private networks as well as public networks such as the internet and distributed ledger-based networks (DLNs) to manage and track the production and shipping of large quantities of items or assets. The use of private networks, however, can be inefficient and costly, while public networks may not provide the desired level of privacy and/or security. For example, public DLNs can expose, by virtue of being public networks, details of private interactions occurring on the networks.

SUMMARY

Figure 1A:
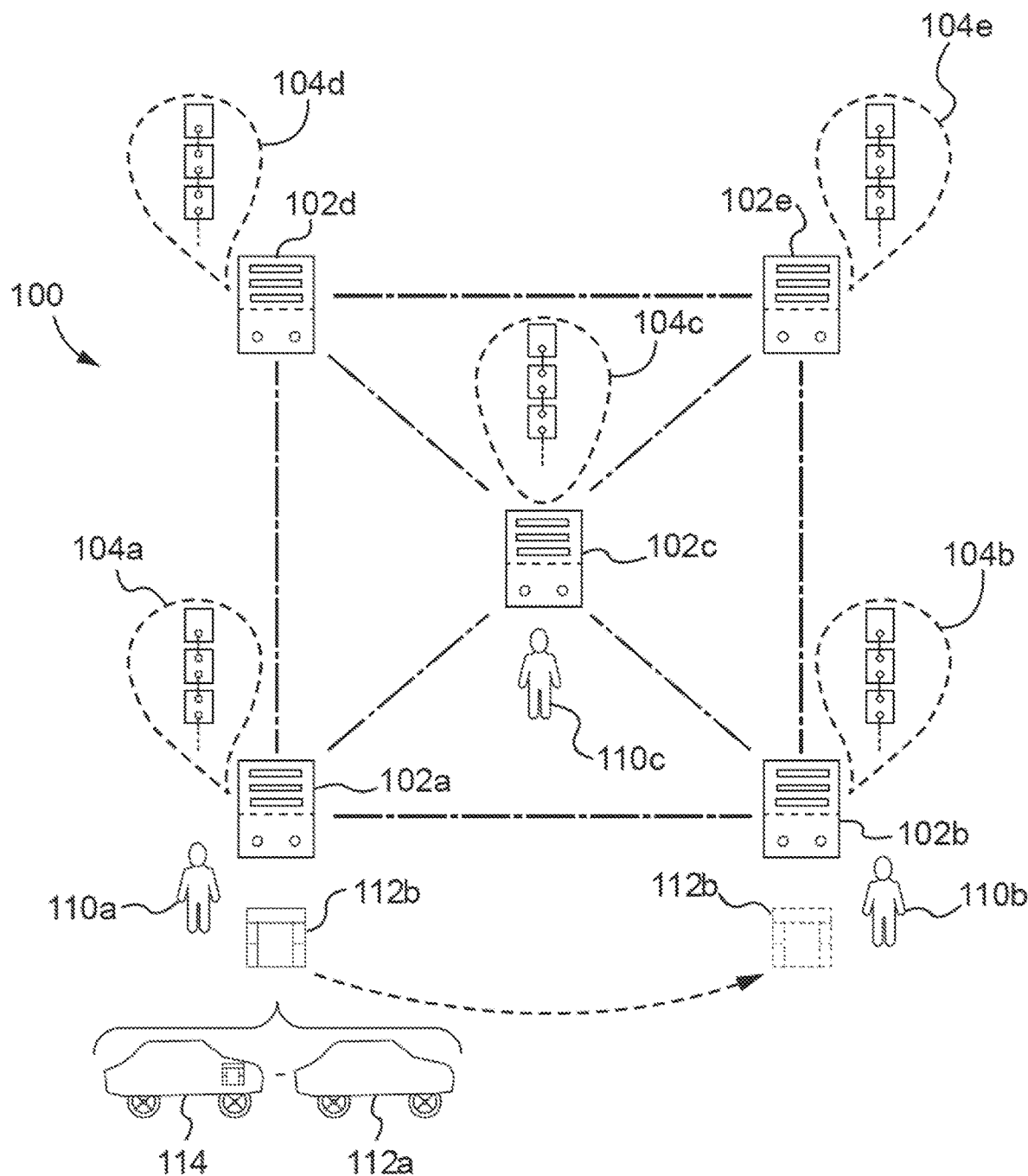
FIGS. 1A-B each shows a zero knowledge proof-enabled distributed ledger-based network configured for use in managing and conducting a private transaction between two parties that are participants of the network, according to some embodiment.

In some embodiments, a method comprises receiving a request that is configured to cause a transfer of a combined asset from a sender to a recipient, the combined asset including a first asset and a second asset. The first asset and the second asset is represented on a distributed ledger-based network (DLN) by a first token associated with a first root node of a first hierarchical tree structure and a second token associated with a second root node of a second hierarchical tree structure, respectively. The first root node is hash-linked to a first plurality of leaf nodes of the first hierarchical tree structure, and the second root node is hash-linked to a second plurality of leaf nodes of the second hierarchical tree structure. The method further includes generating, via a processor and after receiving the request, a third root node of a third hierarchical tree structure, the third root node being hash-linked to a third plurality of leaf nodes of the third hierarchical tree structure that include the first plurality of leaf nodes and the second plurality of leaf nodes. In addition, the method includes generating and sending to a self-executing code segment on the DLN, via the processor, a zero-knowledge proof (ZKP) that the third plurality of leaf nodes include the first plurality of leaf nodes and the second plurality of leaf nodes. The method also includes receiving, in response to verification of the ZKP by the self-executing code segment, a confirmation confirming a representation of the combined asset on the DLN by a third token associated with the third root node of the third hierarchical tree structure.

In some implementations, the generating the third root node of the third hierarchical tree structure includes applying a combination operator to contents of two or more leaf nodes of the third plurality of leaf nodes of the third hierarchical tree. For example, the combination operator can be a concatenation operator. In some implementations, the third plurality of leaf nodes consist the first plurality of leaf nodes and the second plurality of leaf nodes. In some implementations, the first hierarchical tree structure, the second hierarchical tree structure and/or the third hierarchical tree structure are stored off the DLN. In some implementations, the first root node, the second root node and/or the third root node can include data representing an attribute of the first asset, the second asset and/or the combined asset, respectively. The first token, the second token and/or the third tokens can be non-fungible tokens.

In some implementations, the ZKP and/or the verification of the ZKP do not reveal identifying information of the sender, the recipient, the first asset, the second asset, the combined asset, the first token, the second token and/or the third token. In addition, the ZKP and/or the verification of the ZKP do not reveal contents of the first plurality of leaf nodes, the second plurality of leaf nodes and/or the third plurality of leaf nodes.

In some embodiments, a method comprises receiving a request that is configured to cause a transfer of a first sub-asset and/or a second sub-asset from a sender to a recipient, the first sub-asset and the second sub-asset being part of a combined asset represented on a distributed ledger-based network (DLN) by a first token associated with a first root node of a first hierarchical tree structure, the first root node being hash-linked to a first plurality of leaf nodes of the first hierarchical tree structure. Further, the method includes generating, via a processor and upon receiving the request, a second root node of a second hierarchical tree structure and a third root node of a third hierarchical tree structure, the second root node being hash-linked to a second plurality of leaf nodes of the second hierarchical tree structure and the third root node being hash-linked to a third plurality of leaf nodes of the third hierarchical tree structure, the first plurality of leaf nodes including the second plurality of leaf nodes and the third plurality of leaf nodes. In addition, the method includes generating and sending to a self-executing code segment on the DLN, via the processor, a zero-knowledge proof (ZKP) that the first plurality of leaf nodes include the second plurality of leaf nodes and the third plurality of leaf nodes. The method also includes receiving, upon verification of the ZKP by the self-executing code segment, a confirmation confirming a representation, on the DLN, of (1) the first sub-asset by a second token associated with the second root node of the second hierarchical tree structure and/or (2) the second sub-asset by a third token associated with the third root node of the third hierarchical tree structure.

In some implementations, the generating the second root node of the second hierarchical tree structure includes applying a combination operator to contents of two or more leaf nodes of the second plurality of leaf nodes of the second hierarchical tree. The combination operator can be a concatenation operator. In some implementations, the first plurality of leaf nodes consist the second plurality of leaf nodes and the third plurality of leaf nodes. In some implementations, the first hierarchical tree structure, the second hierarchical tree structure and/or the third hierarchical tree structure are stored off the DLN. Further, the first root node, the second root node and/or the third root node include data representing an attribute of the combined asset, the first sub-asset and/or the second sub-asset, respectively. In addition, the first token, the second token and/or the third token are non-fungible tokens.

In some implementations, the ZKP and/or the verification of the ZKP do not reveal identifying information of the sender, the recipient, the first sub-asset, the second sub-asset, the combined asset, the first token, the second token and/or the third token. Further, the ZKP and/or the verification of the ZKP do not reveal contents of the first plurality of leaf nodes, the second plurality of leaf nodes and/or the third plurality of leaf nodes.

DETAILED DESCRIPTION

In some embodiments, parties participating in a transaction may elect to use a public distributed ledger-based network (DLN) to document the details of the transaction and manage its operations. DLNs can provide decentralized platforms that are transparent to at least all the participants of the networks, if not to the public at large, and as such, can be viewed as consensus-based platforms that facilitate trust between transaction participants without the need for a central authority to administer the network. For example, parties participating in a transaction for a sale of a digital music file can use a self-executing code or program (e.g., a smart contract) on the DLN (e.g., a blockchain network) to manage the sale of the music file. The self-executing code or smart contract can regulate the exchange of the music file and the correct payment for the file between the parties without involvement from a third party. In some embodiments, the DLNs can also be used to manage transactions involving physical (e.g., non-digital) assets. In some implementations, this can be accomplished by using tokens to represent the assets, and a sale of an asset can be represented by the transfer of the token representing the asset from one party (e.g., the seller) to a second party (e.g., the buyer).

In some embodiments, a DLN can be and/or support a blockchain network. Throughout the instant disclosure, in some embodiments, the terms "distributed ledger-based network" and "blockchain network" may be used interchangeably. Similarly, in some embodiments, the terms "self-executing code" or "self-executing code segment" and "smart contract" may be used interchangeably. Further, in some embodiments, the term "transaction" may be used to refer to off-chain transactions (e.g., transactions involving the sale of physical or digital assets between parties) and/or on-chain representation of these off-chain transactions (e.g., the transaction of tokens that represent the assets on the blockchain network). Whether the term refers to the former or the latter case should be clear from context. The terms "off-chain" or "off-the DLN" are to be understood to mean "not on the blockchain network" or "not on the DLN." For example, if a statement such as "the application of a hashing function is performed off-the DLN" is to be understood as meaning "the application of the hashing function is not performed on the DLN (and is performed elsewhere)".

As noted above, in some embodiments, the trust the distributed ledger-based networks provide with no need for supervision by a central authority derives from the transparency of the networks to at least all the participants of the network (and in the case of public networks, to the public at large). This transparency, however, can reduce or even eliminate any privacy or confidentiality that participants need or seek when interacting with the network or its participants. For example, in the case of public networks, any interested person can access and inspect the distributed ledgers on the networks to obtain detailed information on all transactions that are represented on the ledgers since the inception of the networks (as the ledgers are, in at least most cases, largely immutable). In some implementations, the lack of privacy or confidentiality can render the use of a public ledger-based network untenable. For instance, a pharmacy using a public blockchain network to manage the fulfillment of orders for shipment of prescription drugs without a mechanism to conceal at least some aspects of the transaction would publicly expose personal and health-related data of its customers (thereby violating their privacy and possibly health privacy laws).

In some cases, private DLNs can be used to provide participants a measure of privacy that may not be available on public networks. The privacy afforded by private (non-ZKP-enabled) DLNs, however, can be far from adequate for most purposes (how ZKPs can be used to provide privacy in private and/or public blockchain networks will be discussed in details below). For example, with reference to the above example, the personal and health-related data of customers would still be available for inspection by other members of the private non-ZKP-enabled DLN (even if the data may be hidden from the public). Further, private non-ZKP-enabled DLNs would be burdensome to maintain as, amongst other reasons, applications developed for public blockchain networks would not seamlessly interoperate on private non-ZKP-enabled blockchain networks.

The inefficiency and cost associated with private non-ZKP-enabled DLNs may be illustrated with reference to the internet, which suffers from several privacy and security-related ills due to the openness of the network to anyone capable of accessing the network. Setting up a "private" intranet network can be one way to combat the noted privacy and security-related ills. Such private networks, however, are likely to severely lag in their developments, and even then to be costly to maintain, compared to the open internet, as the closed nature of the private networks would limit interoperability of applications developed for the open or public internet. Analogously, a private DLN would lag in its development compared to a public DLN and may still be costly to maintain. One or more embodiments described herein disclose methods and systems that are directed at providing enhanced privacy, efficiency and security to DLNs via the implementation of ZKPs in the DLNs. It is to be noted that, although descriptions of these embodiments refer to public DLNs, the methods and systems equally apply to private DLNs.

In some embodiments, as noted above, the current disclosure discloses methods and systems that provide privacy to participants of a transaction on a ZKP-enabled DLN while retaining the level of trust afforded by decentralized networks (i.e., with no central authority) such as DLNs. For example, one or more of the methods and systems disclosed herein allow for the identities of parties to a transaction (e.g., a sale or transfer of an asset between the parties) as well as details of the transaction (e.g., details of the assets being transferred) to remain secret when a public blockchain network is used to manage the transaction. Referring to the example provided above, one or more of the disclosed methods and systems allow the pharmacy to use a public blockchain network to facilitate the shipment of the drugs without revealing on the blockchain network (or publicly) any identifying information related to the assets (i.e., the drugs), the sender (i.e., the pharmacy) and/or the recipient of the assets (i.e., the clients), while depending on the trust afforded by the blockchain network at least partly as a result of the transparency inherent to public blockchain networks. In such examples, the sender and the recipient may be represented by their respective public keys on the blockchain network.

In some embodiments, the methods and systems enhance the efficiency of actions represented on ZKP-enabled DLNs while still retaining the level of trust afforded by decentralized networks as noted above. In some implementations, an action may be a transaction involving the transfer of multiple assets between participants of the DLN, and the transferor may wish to combine the multiple assets into a single asset to simplify the shipping process. For example, the above-mentioned client of the pharmacist may be a clinic ordering a variety of drugs, and the pharmacist may wish to combine all the drugs into a single package before shipping to the client. In such cases, the pharmacist can tokenize the individually ordered drugs and combine the individual asset tokens (or, in some instances, the hashes of the asset tokens) to represent the combined package containing the individually ordered drugs. The pharmacist may then represent, on the ZKP-enabled DLN, the shipping of the combined package, thereby greatly increasing the efficiency of his/her operations (compared to when, for example, the pharmacist ships each ordered drug individually (and represents the shipping on the ZKP-enabled DLN separately)). That is, a user of the disclosed ZKP-enabled DLN can use the methods and systems disclosed herein to facilitate the combining of the multiple assets into a single asset prior to transferring the combined asset to a recipient, as the disclosed methods and systems allow one to represent the combined asset and its transfer on the ZKP-enabled DLN.

In some instances, the actions may be the actions of a single participant that uses the ZKP-enabled DLN to, amongst other things, manage an inventory or a manufacturing process. For example, the DLN participant may be a vehicle manufacturer that assembles a large number of car parts (referred to as assets in this example) to produce or manufacture a vehicle. In such an example, the participant may tokenize the car parts (e.g., use asset tokens or hashes of asset tokens to identify the individual car parts) and generate a combined asset token or asset token hash to identify the manufactured (i.e., assembled) vehicle by combining the asset tokens or the asset token hashes that identify the car parts that constitute the assembled vehicle. For example, for each car part that goes into making or assembling a vehicle, the vehicle manufacturer may generate an asset token hash by hashing or applying a hashing function on one or more identifying parameters of the car part and combine the asset token hashes to form a combined asset token hash that identifies the vehicle manufactured by assembling the car parts. In some embodiments, a ZKP-enabled DLN may be used to manage the inventory of the assets (e.g., the car parts) and/or the manufacturing process to produce a combined asset (e.g., the assembling of the car parts to produce the vehicle). In some embodiments, as mentioned above, the ZKP-enabled DLN can be used to transfer the combined asset (or the individual assets, if desired) to another participant on the ZKP-enabled DLN.

In some instances, an action may be a transaction involving the transfer of a part or component of a larger combined asset between participants of the DLN, and the transferor may wish to split the combined asset into multiple parts and transfer (e.g., ship) the desired constituent asset or assets to a transferee (e.g., a purchaser). For example, an owner of a damaged or totaled vehicle may receive a purchase order for the engine of the vehicle, and the owner may be willing to sell the engine separately from the rest of the damaged vehicle. In such cases, the owner may initially tokenize the whole vehicle (if not already done so), and then proceed to tokenize the engine and the rest of the damaged vehicle separately. The asset token that identifies the whole vehicle may be a combination of the asset token identifying the engine and the asset token identifying the rest of the damaged vehicle. In allowing the splitting of a combined or composite asset into constituent assets that can be transferred separately, such embodiments can facilitate transactions (e.g., transfers of assets) to be represented on the ZKP-enabled DLN. That is, a user of the disclosed ZKP-enabled DLN can use the methods and systems disclosed herein to facilitate the partitioning or splitting of a combined or composite asset into multiple constituent assets prior to transferring at least one of the constituent assets to a participant, as the disclosed methods and systems allow one to represent the multiple constituent assets and their transfers on the ZKP-enabled DLN. In some instances, one or more of the rest of the constituent assets may be transferred to the same participant or to other participants of the ZKP-enabled DLN.

In some instances, the actions may be the actions of a single participant that uses the ZKP-enabled DLN to, amongst other things, manage an inventory (e.g., without necessarily transferring the constituent assets to a recipient). For example, the DLN participant may be a retailer that receives a large amount of wholesale products (i.e., bulk products) that usually are partitioned or split into multiple (e.g., individualized) components before the components are made available to customers. In such examples, the retailer may tokenize the bulk product (i.e., the combined asset) as well the multiple components that the bulk product (i.e., the constituent assets) would be split into, and the asset token identifying the bulk product may be a combination of the asset tokens identifying the multiple components. In some implementations, the retailer may generate the constituent asset tokens identifying the multiple components by hashing or applying a hashing function or algorithm on one or more identifying parameters of the multiple components. The retailer may then combine the constituent asset tokens of the multiple components to generate the combined asset token for the combined asset (e.g., the bulk product). For example, the constituent asset tokens may be generated by applying a hashing function or algorithm on an identifying parameter such as but not limited to the serial number of each bulk product, and the combined asset token may be generated by combining the asset tokens of the constituent assets (e.g., the multiple components into which the bulk product is split). Alternatively or in addition, the combined asset token may be generated by hashing identifying parameters of the bulk asset. By using these asset tokens on the ZKP-enabled DLN, a DLN participant such as a retailer can use the ZKP-enabled DLN to manage the inventory of wholesale or bulk products as well as constituent products into which the bulk products are split. In some instances, as mentioned above, the ZKP-enabled DLN can also be used to transfer the constituent assets or products to another participant on the ZKP-enabled DLN.

For both actions that involve combining multiple assets into a single asset and actions that involve splitting a combined asset into multiple assets, it can be desirable to verify the accuracy and efficacy of the combining and splitting performed for example on a ZKP-enabled DLN. It can be desirable that such a verification can be performed in a private manner and without revealing the metadata of the token (e.g., possibly revealing the owner of the underlying asset, the identity of the underlying asset, etc.). In such instances, ZKPs can be used as discussed below to perform the verification process while maintaining privacy. In some embodiments, the accuracy and efficacy of combining and/or splitting assets performed, for example, on a DLN without the use of ZKPs. Such embodiments, some using ZKPs and some without using ZKPs are described below.

Some of the disclosed embodiments can be used for transactions on a blockchain (or distributed ledger), which can be used to transfer asset tokens that contain arbitrarily large, hierarchically structured data. For example, a blockchain can be used as part of a supply-chain management solution. In some instances, the disclosed embodiments can be employed where a hierarchical tree structure of data is split or joined. That is, when the data objects that are involved in the blockchain transactions are to be split into multiple data objects, or multiple data objects are to be joined into one, then the disclosed embodiments can be used to determine or verify the completeness of these splits and joins.

In some embodiments, a zero knowledge proof (ZKP) module can be used in a blockchain (or distributed ledger) system that transacts non-fungible tokens (that may represent real world assets, for example) that are represented by the root hashes of a tree structure (e.g., a Merkle tree). If these non-fungible tokens are to be split and joined in a private manner (without revealing certain information to the public or other participants of the blockchain that are not party to a transaction involving the joining and splitting of the asset tokens), then a zero knowledge proof can be constructed to check the completeness of the splits and joins. The blockchain can verify this proof and perform the relevant changes to the state information (e.g., only if the proof verification succeeds).

In some embodiments, the methods and systems disclosed herein verify, after asset tokens are split or joined together, the resulting joined or split asset tokens are at least a substantially complete representation of their corresponding inputs. In some implementations, by creating hierarchical trees whose root hashes are used as their identifiers on the blockchain, double spend can be eliminated if the join/splits contain duplicate information among themselves in their creation. Further, if the hierarchical data has to be split/joined and transferred to another party without revealing the meta-data of the data objects, then the splitting/joining and/or transferring can be done by privately by verifying the completeness using zero knowledge proofs.

The methods and systems disclosed herein include at least two features: storing complex hierarchical data suitable for use with a blockchain; and joining and splitting such data while facilitating or ensuring completeness in the splits and joins. In some embodiments, the data to be stored can be arranged in a hierarchical hash-linked tree structure. Each node within the tree can contain data items that represent attributes relevant to that node and hashes of child data items. In some embodiments, the root node contains data and/or hashes of child data items (e.g., xor of the hashes of the leaf nodes of the tree structure). In some embodiments, the root node does not contain any data (e.g., contains only hashes of child data items).

In some embodiments, each node on the tree structure may be stored in a content-addressed data store, whereby the storage location of a node can be represented by the hash of that node (including the hashes of any child nodes). In some embodiments, this can create an immutable or nearly immutable tree of nodes, with a root node, the hash of which can be used to access the entire tree and all of the data therein and the root hash is used as the identifier of the data stored in hierarchical tree structure.

Below, an example embodiment of a method for joining or splitting data of hierarchical structure and verifying that the joined or split object contains the input objects is shown. Although the example embodiment discusses three hierarchical data objects, it is to be understood that the method applies to any number of a plurality of data objects. That is, the methods can be applied to join any number of hierarchical data objects or to split into any number of hierarchical objects.

FIG. 1A shows a ZKP-enabled DLN configured for use in managing and representing a private transaction between two parties that are participants of the network, in particular a public network, according to some embodiment. In some embodiments, the ZKP-enabled DLN or blockchain network 100 includes a plurality of computing nodes 102a-102e configured to communicate amongst each other via a peer-to-peer (P2P) connection. In some implementations, the computing nodes 102a-102e can be computing devices including but not limited to computers, servers, processors, data/information processing machines or systems, and/or the like, and may include data storage systems such as databases, memories (volatile and/or non-volatile), etc. In some implementations, the P2P connections may be provided by wired and/or wireless communications systems or networks such as but not limited to the internet, intranet, local area networks (LANs), wide area networks (WANs), etc., utilizing wireless communication protocols or standards such as WiFi®, LTE®, WiMAX®, and/or the like.

In some embodiments, the ZKP-enabled DLN 100 may include self-executing codes or smart contracts that are configured to execute upon fulfillment of conditions that are agreed upon between transacting parties. For example, some or all of the computing nodes 102a-102e may include copies of a self-executing code that self-execute upon fulfillment of the conditions. In some implementations, the computing nodes 102a-102e may communicate with each other to exchange the results of the executions of their respective self-executing codes so that at least a substantial number or percentage of the computing nodes 102a-102e arrive at a consensus on the results. In some implementations, one or a few of the computing nodes 102a-102e may have self-executing codes that self-execute, and the results would be transmitted to the rest of the computing nodes 102a-102e for confirmation.

In some embodiments, a self-executing code or a smart contract can facilitate the completion of transactions on the ZKP-enabled DLN 100 by providing the transacting parties confidence that the other party would deliver the promised product or payment. For example, with reference to the above example related to the sale of a digital music file, a smart contract can be used to verify that the seller of the file is in fact an owner of the file, the buyer of the music file has adequate resource to pay for the music, etc. Further, the smart contract can facilitate the exchange of the music file by allowing the transfer of a payment to occur only after the transfer of the music file is completed (and validated).

In some embodiments, the ZKP-enabled DLN 100 may be linked to one or more oracles (not shown) or data feeds that provide external data to the ZKP-enabled DLN 100. In some implementations, as discussed above, self-executing codes or smart contracts can automatically execute upon realization of some conditions of a transaction, and the oracles may provide the data that can be used to evaluate whether the conditions are met. For example, a transaction may be contingent on the price of a stock, a weather condition, etc., and an oracle may provide the requisite information to the smart contract facilitating the transaction. The smart contract, upon receiving the information, may self-execute after determining that the condition for the transaction has been fulfilled. In some embodiments, the oracles may facilitate for the smart contracts to send data out to external systems. For example, a smart contract may be configured to send out information to a smartphone when an account on the ZKP-enabled DLN 100 receives a payment, and an oracle may serve as a transit hub for the data including the information during its transmission to the smartphone.

In some embodiments, at least a substantial number of the computing nodes 102a-102e include copies of a distributed ledger 104a-104e onto which transactions that occur on the network are recorded. The recording of the transactions on the distributed ledger 104a-104e may occur when some substantial proportion of the computing nodes 102a-102e, or a subset thereof, agree on the validity of the transactions. The distributed ledger 104a-104e can be immutable or nearly immutable in the sense that to alter the distributed ledger 104a-104e, at least this substantial portion of the computing nodes 102a-102e would have to agree, which can be increasingly difficult when the number of computing nodes 102a-102e is large (and the distributed ledger 104a-104e gets longer).

As noted above, the ZKP-enabled DLN 100 can be used to facilitate transactions that involve digital assets (e.g., sale of digital music files). In some embodiments, the ZKP-enabled DLN 100 can also be used to facilitate transactions of assets that occur off-chain or off-line (e.g., transactions of physical assets) such as, but not limited to, the aforementioned selling of drugs by a pharmacy or a vehicle by a car manufacturer. In some implementations, a physical off-chain asset can be tokenized by cryptographically hashing one or more identifying parameters of the physical off-chain asset to generate an asset token that can serve as a unique asset identifier of the physical off-chain asset. In some implementations, these off-chain assets can be represented by token commitments on the ZKP-enabled DLN 100, and the sale or transfer of the off-chain assets can be represented by the ZKP-enabled DLN 100 by the transfer of the token commitments between the blockchain accounts of the transacting parties.

In some implementations, the types of asset tokens that can be used as asset identifiers and/or token commitments that can be used to represent the off-chain assets can depend on the nature of the assets themselves. For example, fungible products (e.g., some amount of gasoline or a currency) can be identified with fungible asset tokens while non-fungible products (e.g., distinguishable products such as a product with a serial number) can be identified by non-fungible asset tokens. In such implementations, the token commitments that represent the non-fungible assets on the ZKP-enabled DLN 100 would be representing or be related to non-fungible asset tokens that identify the non-fungible assets. In some implementations, the token commitments that represent fungible assets on the ZKP-enabled DLN 100 would be representing or be related to fungible asset tokens that identify the fungible assets.

FIG. 1A shows an example embodiment of a transaction that involves the sale of an off-chain asset (e.g., a vehicle part or component such as engine 112b) from a first transaction participant 110a to a second transaction participant 110b. In such example, the vehicle part 112b may be represented on the ZKP-enabled DLN 100 with a non-fungible token commitment that can be transferred from the first transaction participant 110a to the second transaction participant 110b to represent the sale or transfer of the vehicle part 112b during the transaction between the two parties. In some embodiments, asset tokens and/or token commitments may be stored off-chain, i.e., off of the ZKP-enabled DLN 100. For example, asset tokens and/or token commitments may be stored in storage systems or databases that are linked with the ZKP-enabled DLN 100. For instance, if the ZKP-enabled DLN 100 is a ZKP-enabled Ethereum blockchain network, the asset tokens and/or token commitments may be stored in the Swarm database. In some embodiments, the asset tokens and/or token commitments may be stored on the ZKP-enabled DLN 100 (e.g., in the storage systems associated with the computing nodes 102a-102e).

In some instances, as noted above, transactions that occur on the ZKP-enabled DLN 100 (including off-chain transactions that are represented on the ZKP-enabled DLN 100 with the use of asset tokens or token commitments, for example) are recorded onto at least a substantial number of the distributed ledgers 104a-104e that exist on the ZKP-enabled DLN 100. For example, a transaction between a first transaction participant 110a and a second transaction participant 110b on the ZKP-enabled DLN 100 representing the transfer of an off-chain asset 112 from the former to the latter would be recorded on all or nearly all of the distributed ledgers 104a-104e once the transaction details are accepted as valid by the participants of the ZKP-enabled DLN 100. In the case of a blockchain network that is not ZKP-enabled, however, the first transaction participant 110a and the second transaction participant 110b are afforded little or no privacy as all or nearly all the details of the transaction are made public or visible to all that have access to the blockchain network (the public, in case of public blockchains), such details including confidential information on the transacting participants, the asset being transacted, the asset tokens used to identify the asset on the blockchain network, and/or the like. In some embodiments, the present disclosure discloses methods and systems directed at providing privacy and ease to transactions that occur, or are represented on public blockchains, with the use of zero knowledge proofs (ZKPs).

In some instances, the off-chain asset 112b may be a part or component of a composite or combined asset 114, and the first transaction participant 110a may obtain this constituent asset 112b from the combined asset 114 before transferring the constituent asset 11b2 to the second transaction participant 110b. For example, the first transaction participant 110a may be an owner of a damaged vehicle 114 that has received an order for a part of the vehicle (e.g., the engine) and the manufacturer may obtain the engine (i.e., the constituent asset 112b) from the vehicle (i.e., the combined asset 114) by taking the engine apart from the vehicle (e.g., separating the engine 112b from the vehicle chassis 112a). In some embodiments, the combined asset 114 can be partitioned or split into multiple constituent assets 112b, 112a (e.g., two assets, three assets, four assets, etc.). In such embodiments, one or more of the multiple constituent assets 112b, 112a may be transferred to the first transaction participant 110a while the rest of the multiple constituent assets 112b, 112a may not be transferred to the second transaction participant 110b, to the other participants of the ZKP-enabled DLN 100 or may not be transferred at all (e.g., kept by the first transaction participant 110a).

In some instances, the first transaction participant 110a may tokenize the combined asset 114 and/or its constituent assets 112b, 112a by cryptographically hashing one or more identifying parameters of the combined asset 114 and/or its constituent assets 112b, 112a, respectively, to generate respective asset tokens that can be used as identifiers for the assets. Further, the combined asset 114 and/or its constituent assets 112b, 112a may be represented on the ZKP-enabled DLN 100 using token commitments that can be generated using the asset tokens of the combined asset 114 and/or its constituent assets 112b, 112a, respectively. In some instances, the generation of the asset tokens and/or the token commitments may be performed off-chain, i.e., off of the ZKP-enabled DLN 100. In some implementations, the first transaction participant 110a may represent the transfer of the constituent asset 112 to the second transaction participant 110b by transferring the token commitment of the constituent asset 112b to the second transaction participant 110b. In some embodiments, the generation of the asset tokens and/or the token commitments to identify and/or represent on the ZKP-enabled DLN 100 the combined asset 114 and/or its constituent assets 112b, 112a may be accomplished with the use of ZKPs. In some implementations, ZKPs can be used to enhance the privacy, ease and efficiency of the process to divide the combined asset into the constituent assets 112b, 112a and transfer one or more of the constituent assets 112b, 112a to the second transaction participant 110b. For example, the use of ZKPs in such cases may allow the first transaction participant 110a to keep as secret some or all of the details related to the constituent assets 112b, 112a, the combined asset 114, the first transaction participant 110a, the second transaction participant 110b, and/or the like (thereby significantly enhancing the privacy level afforded to participants of the ZKP-enabled DLN 100).

Figure 1B:
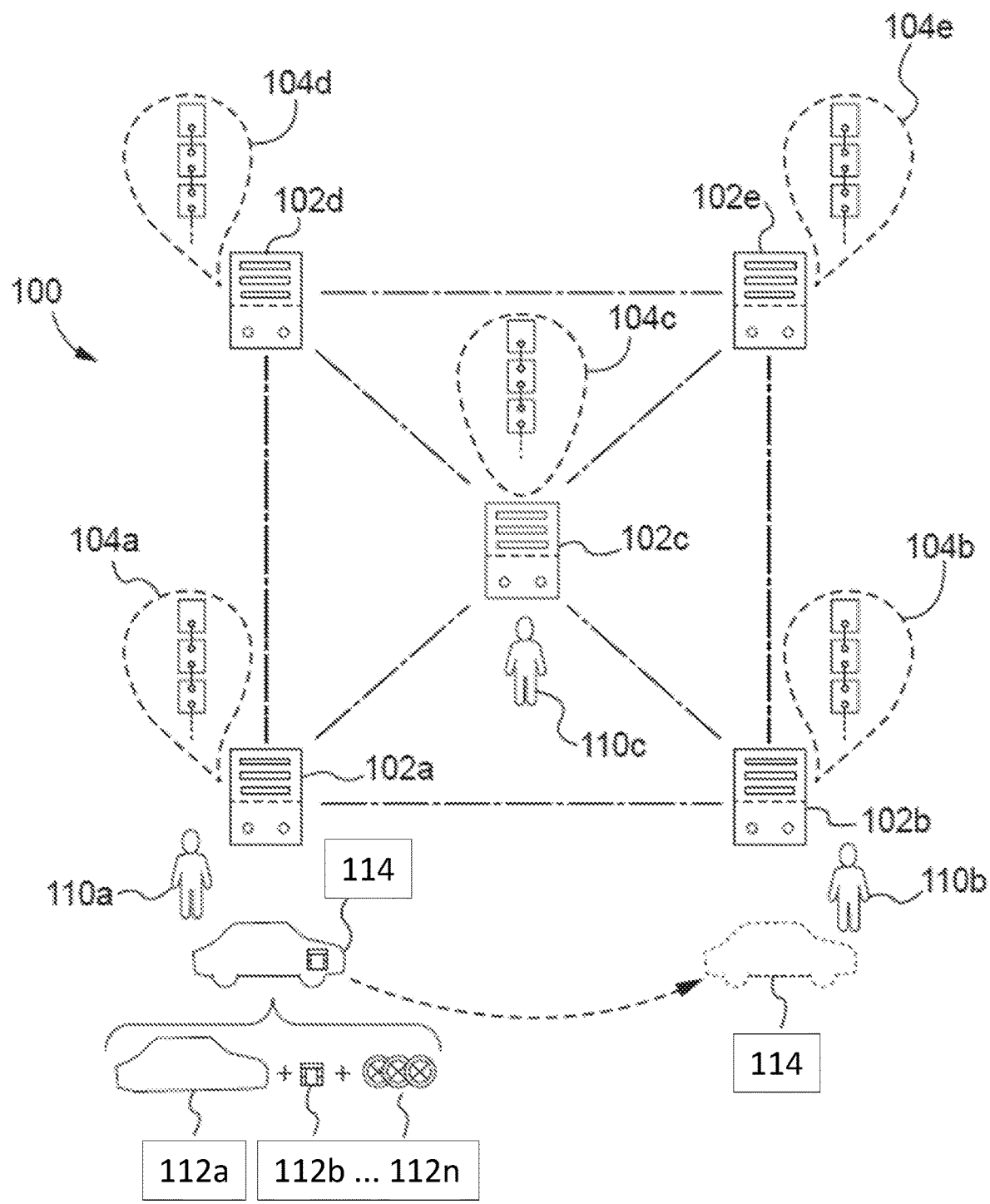

FIG. 1B shows an example of a transaction that involves the sale of an off-chain asset (e.g., a vehicle having a combination of multiple parts or components) from a first transaction participant 110a to a second transaction participant 110b. As shown in FIG. 1B, the off-chain asset 114 may have to be assembled by the first transaction participant 110a from multiple assets 112a-112n (e.g., asset parts) before being transferred to the second transaction participant 110b. For example, the first transaction participant 110a may be a vehicle manufacturer that received an order for a vehicle and the manufacturer may assemble the multiple assets 112a-112n to produce the asset 114 (i.e., vehicle). In some embodiments, the first transaction participant 110a may represent each asset part 112a-112n on the ZKP-enabled DLN 100 using a token, and further represent the assembling of the multiple assets 112a-112n into the asset 114 by combining the tokens into a combined token that represents the asset 114 on the ZKP-enabled DLN 100. In some instances, the tokens representing the part assets 112a-112n and/or the combined token may be generated on the ZKP-enabled DLN 100. In some implementations, the first transaction participant 110a may represent the transfer of the asset 114 to the second transaction participant 110b by transferring the combined token to the second transaction participant 110b as described above. In some embodiments, the generation of the tokens and the combined token, on the ZKP-enabled DLN 100, to represent the multiple assets 112a-112n and the asset 114, respectively, may be accomplished with the use of ZKPs to enhance the privacy and efficiency of the assembly process to produce the asset 114. Further, in some embodiments, the transfer, on the ZKP-enabled DLN 100, of the combined token to represent the transfer of the physical asset 114 may also be accomplished with the use of ZKPs to enhance the privacy and efficiency of the asset transfer process. For example, the use of ZKPs in such embodiments allows the first transaction participant 110a to keep as secret some or all of the details related to the multiple assets 112a-112n, the asset 114, the first transaction participant 110a, the second transaction participant 110b, and/or the like (thereby significantly enhancing the privacy level afforded to participants of the ZKP-enabled DLN 100).

In some embodiments, ZKPs can be used by a first entity, the "prover" or "provider" of the proofs, to convince a second entity, the "verifier" of the proofs, that a statement about some secret information is truthful without having to reveal the secret information to the verifier. ZKPs can be interactive, i.e., require interaction from the prover for the verifier to verify the truthfulness of the statement. In some embodiments, the ZKPs can be non-interactive, requiring no further interaction from the prover for the verifier to verify the statement. Examples of non-interactive ZKPs include zero-knowledge succinct non-interactive argument of knowledge (zk-SNARK), zero-knowledge scalable transparent argument of knowledge (zk-STARK), etc. Discussions of ZKPs, zk-SNARK, zk-STARK, etc., can be found in U.S. patent application Ser. No. 16/383,845 filed on Apr. 15, 2019 and entitled "Methods and Systems for Identifying Anonymized Participants of Distributed Ledger-Based Networks Using Zero-Knowledge Proofs", which is incorporated by reference herein in its entirety.

Figure 2:
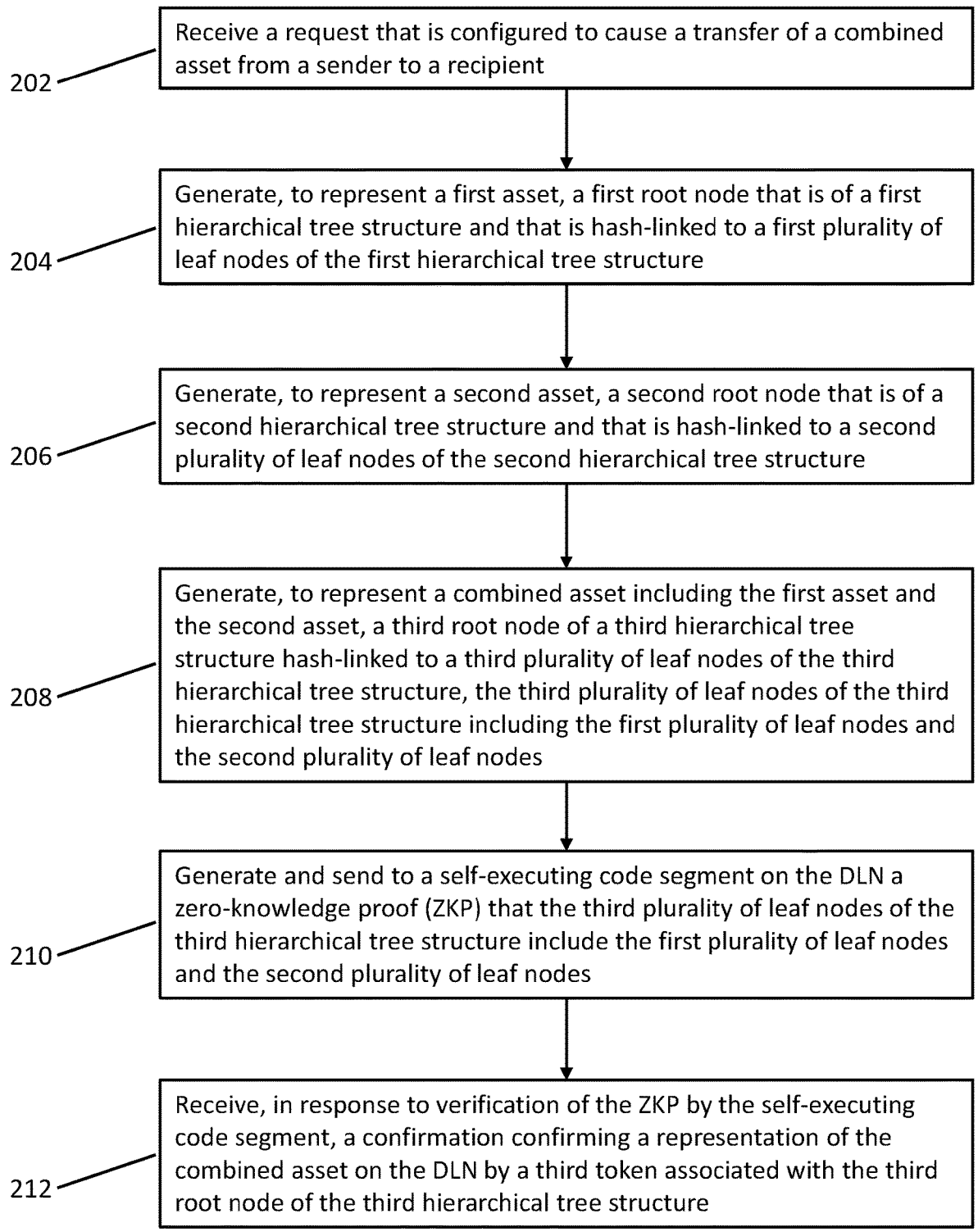
FIG. 2 illustrates a method for verifying the completeness of joins of data object using ZKP proofs, according to an embodiment.

FIG. 2 shows a flowchart illustrating a method for verifying the completeness of joins of data objects, according to an embodiment. The term "data object" can refer to data values or groups of data values that define the assets tokens that represent physical assets including, for example, non-fungible off-chain assets. The apparatus and methods for joining data objects (or the related asset tokens) are described in detail in U.S. patent application Ser. No. 16/283,452, filed on Feb. 22, 2019 and entitled "Methods and Apparatus for Enhancing Privacy and Efficiency on Distributed Ledger-Based Networks", which is incorporated herein by reference.

Figure 4:
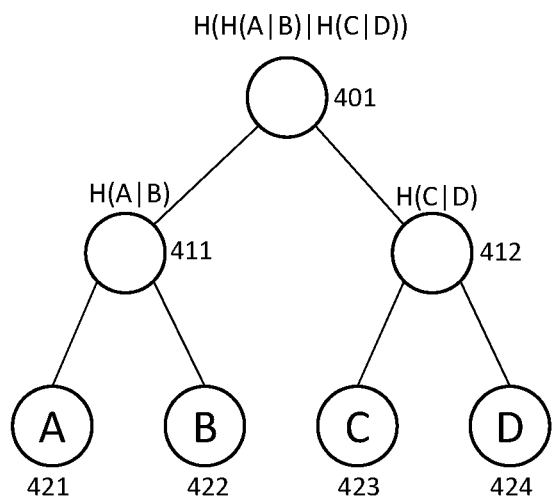
FIG. 4 illustrates an example of a hierarchical tree structure that represents an asset represented by leaf nodes A-D.

As shown in FIG. 2, at 202, a request is received that is configured to cause a transfer of a combined asset from a sender to a recipient. The combined asset can be, for example, a vehicle such as vehicle 114 discussed above in connection with FIG. 1B. At 204, a first root node of a first hierarchical tree structure is generated. The first root node can represent a first asset. FIG. 4 illustrates an example of such a first hierarchical tree structure that represents the first asset as represented by leaf nodes A-D. The first root node is hash-linked to at least one leaf node of the first hierarchical tree structure. Following the example of FIG. 4, the first root node 401 is hash-linked to child nodes 411 and 412; in turn, child node 411 is hash-linked to leaf nodes 421 and 422, and child node 412 is hash-linked to leaf nodes 423 and 424. The first asset can be, for example, a vehicle part or component such as vehicle chassis 112a discussed above in connection with FIG. 1B. Each node within the first hierarchical tree structure can contain, for example, data items that represent the attributes relevant to that node (e.g., serial number, part number, color identifier, etc.) and a hash value of each connected child node within the first hierarchical tree structure. The root node of the first hierarchical tree structure can also include such data items and a hash value of each connected child node within the first hierarchical tree structure, but the root node can also include the result of a combination operator of the hashes of the child nodes within the first hierarchical tree structure (i.e., all leaf nodes within the first hierarchical tree structure). An example of a combination operator $\oplus$ is a concatenation operator |.

As such, with reference to example embodiment of FIG. 4, a first root node 401 of a first hierarchical tree structure that represents a first physical asset (e.g., vehicle chassis 112a) is hash-linked to a plurality of leaf nodes 421-424, each leaf node of the plurality of leaf nodes 421-424 including data items that represent the attributes relevant to that node (e.g., serial number, part number, color identifier, etc.). To generate the first root node 401, one may start with multiple leaf nodes (e.g., 421 and 422), apply a hashing function to the contents of these leaf nodes and combine the resulting hashes to arrive at or generate the child node 411. In some implementations, one may first combine the contents of the leaf nodes 421 and 422 and combine these to arrive at or generate the child node 411. Similar computations as the ones discussed with respect to leaf nodes 421 and 422 may then be performed with the rest of leaf nodes of the plurality of leaf nodes 421-424 (e.g., leaf nodes 423 and 424), resulting in one or more child nodes (e.g., leaf node 412). The resulting child nodes (e.g., child node 411 and 412) may then be combined and hashed (or hashed and combined, in some implementations) repeatedly/iteratively until the first root node 401 is generated or obtained.

Each node of the first hierarchical tree structure can be stored, for example, in a content-addressed data store where the storage location of the node is represented by the hash of that node (including the hashes of any child nodes). The content-addressed data store can be, for example, in one or more of the locations of distributed ledger 104a-104e. This hierarchical tree structure defines an immutable tree of nodes, with a root node, the hash of which can be used to access the entire tree and all of the data therein, and where the root node is used as the identifier of the data stored in hierarchical tree structure.

Figure 5:
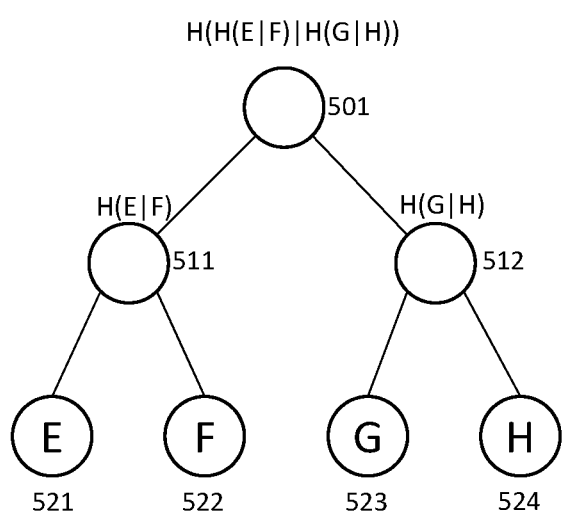
FIG. 5 illustrates an example of a hierarchical tree structure that represents an asset represented by leaf nodes E-H.

At 206, a second root node of a second hierarchical tree structure is generated. The second root node can represent a second asset. FIG. 5 illustrates an example of such a second hierarchical tree structure that represents the second asset as represented by leaf nodes E-H. The second root node is hash-linked to at least one leaf node of the second hierarchical tree structure. In some implementations, the second root node is hash-linked to each leaf node of the second hierarchical tree structure. Following the example of FIG. 5, the first root node 501 is hash-linked to child nodes 511 and 512; in turn, child node 511 is hash-linked to leaf nodes 521 and 522, and child node 512 is hash-linked to leaf nodes 523 and 524. The second asset can be, for example, a part or component for the vehicle such as a vehicle engine 112b discussed above in connection with FIG. 1B. The second hierarchal tree structure can be structured and have the same characteristics as described above in connection with the first hierarchical tree structure. In other words, for instance, with reference to example embodiment of FIG. 5, a second root node 501 of a second hierarchical tree structure that represents a second physical asset (e.g., vehicle engine 112b) is hash-linked to a plurality of leaf nodes 521-524, each leaf node of the plurality of leaf nodes 521-524 including data items that represent the attributes relevant to that node (e.g., serial number, part number, color identifier, etc.). The generation of the second root node 501 may be computed in a similar manner as discussed above with respect to first root node 401.

Figure 6A:
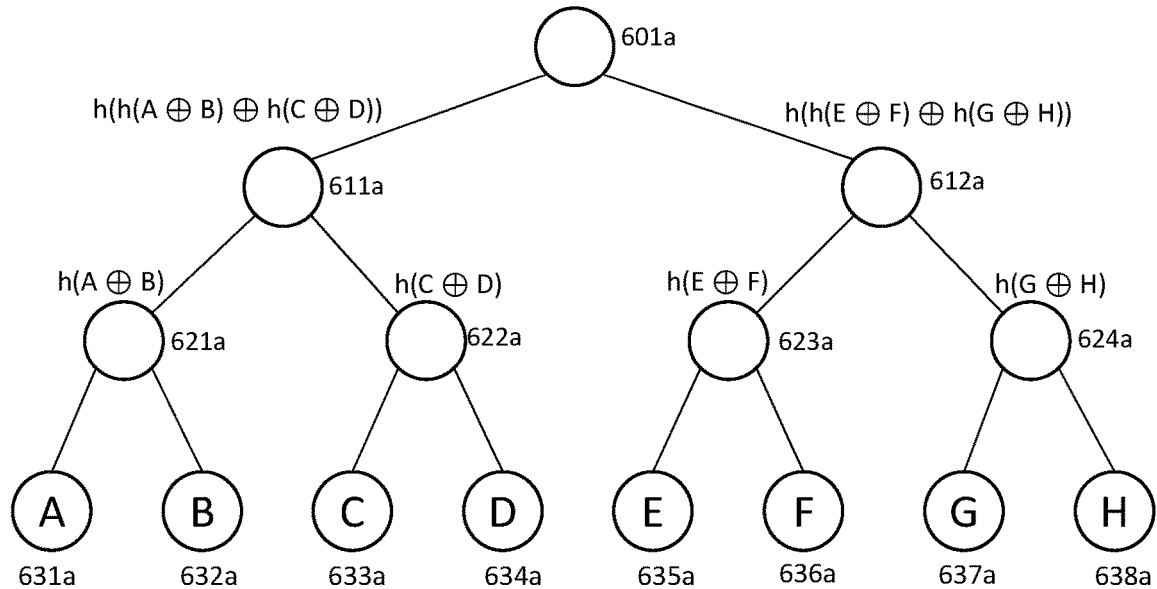
FIGS. 6A-B illustrate examples of hierarchical tree structures that represent an asset represented by leaf nodes A-H.
Figure 6B:
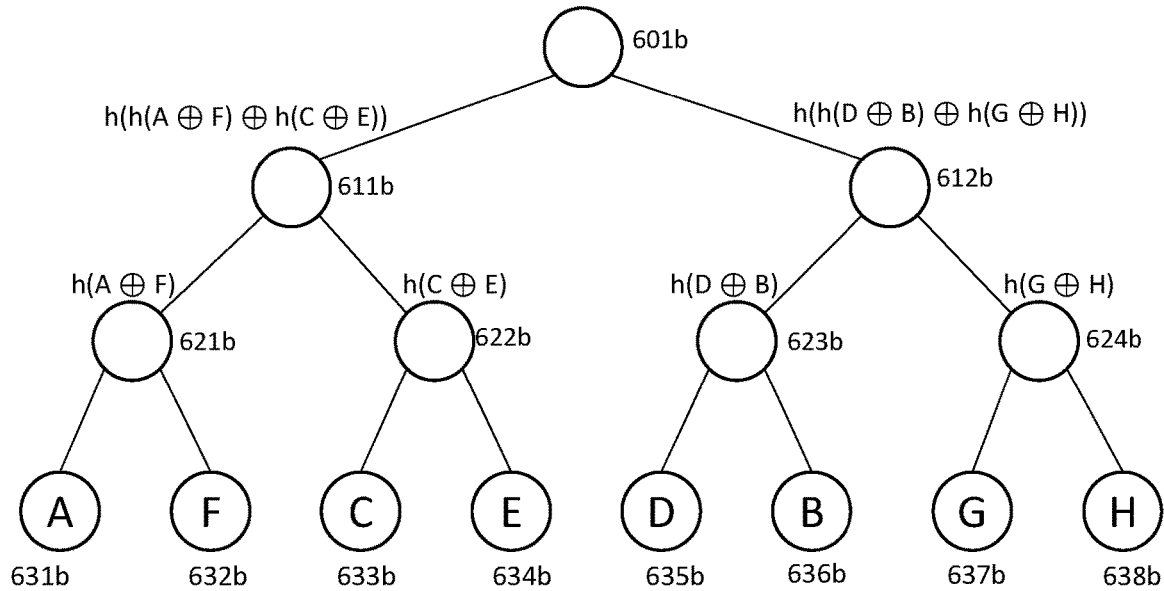

At 208, a third root node of a third hierarchical tree structure is generated. The third root node can represent a combined asset that includes the first asset and the second asset. FIGS. 6A-B illustrate examples of such third hierarchical tree structures that represent the combined asset as represented by child nodes A-H. The third root node is hash-linked to at least one leaf node of the third hierarchical tree structure. In some implementations, the third root node is hash-linked to each leaf node of the third hierarchical tree structure. Following the example of FIG. 6A, the first root node 601a is hash-linked to child nodes 611a and 612a; in turn, child node 611a is hash-linked to child nodes 621a and 622a, and child node 612a is hash-linked to child nodes 623a and 624a. Child node 621a is hash-linked to leaf nodes 631a and 632a; child node 622a is hash-linked to leaf nodes 633a and 634a; child node 623a is hash-linked to leaf nodes 635a and 636a; child node 624a is hash-linked to leaf nodes 637a and 638a. The combined asset can be, for example, a vehicle such as vehicle 114 discussed above in connection with FIG. 1B.

The generation of the third hierarchical tree structure of FIG. 6A that includes the third root node 601a that represents the combined asset (i.e., a combined asset of the first asset represented by the first root node of the first hierarchical tree structure of FIG. 4 and the second asset represented by the second root node of the second hierarchical tree structure of FIG. 5) may be accomplished or computed in a similar manner as the generation of the first and second hierarchical tree structures by starting with a group of leaf nodes that includes the leaf nodes of the first hierarchical tree structure and the leaf nodes of the second hierarchical tree structure. In other words, the leaf nodes of the third hierarchical tree structure include the leaf nodes of the first hierarchical tree structure (e.g., leaf nodes 421-424) and the second hierarchical tree structure (e.g., leaf nodes 521-524). In some implementations, the leaf nodes of the third hierarchical tree structure consist of the leaf nodes of the first hierarchical tree structure (e.g., leaf nodes 421-424) and the second hierarchical tree structure (e.g., leaf nodes 521-524), i.e., the leaf nodes of the third hierarchical tree structure include all and only the first hierarchical tree structure and the second hierarchical tree structure.

For example, to generate the third hierarchical tree structure of FIG. 6A that includes the third root node 601a that represents the combined asset (i.e., a combined asset of the first asset represented by the first root node 401 of the first hierarchical tree structure of FIG. 4 and the second asset represented by the second root node 501 of the second hierarchical tree structure of FIG. 5), one may start with all the leaf nodes of the first hierarchical tree structure of FIG. 4 (leaf nodes 421-424) and all the leaf nodes of the first hierarchical tree structure of FIG. 5 (leaf nodes 521-524). Then one may combine and hash (or hash and combine, in some implementations) the leaf nodes repeatedly/iteratively in a similar manner as described above with reference to FIG. 4 to arrive at the third root node 601a (and generate the third hierarchical tree structure (FIG. 6A).

In some embodiments, the third root node 601a of the third hierarchical tree structure (e.g., FIG. 6A) may be obtained by combining and hashing (or hashing and combining, in some implementations) the first root node 401 and the second root node 501 of the first and second hierarchical tree structures, respectively. In some embodiments, this may not be the case. For example, FIG. 6B shows a hierarchical tree structure that is generated starting with the same leaf nodes as the FIG. 6A, except the combining and hashing operations are performed in a different order compared to the computation that resulted in the hierarchical tree structure of FIG. 6A. As the leaf nodes of the hierarchical tree structure of FIG. 6B is the same as the leaf nodes of the hierarchical tree structure of FIG. 6A (although combined and hashed in different orders of leaf nodes), the root node 601b represents the same combined asset as the root node 601a. However, the root node 601b may not be obtained by simply combining and hashing (or hashing and combining, in some implementations) the first root node 401 and the second root node 501.

The completeness of a hierarchical tree structure that represents on a DLN a combined asset formed by joining multiple assets (e.g., a first asset and a second asset) may be shown by proving that the hierarchical tree structure includes all the leaf nodes of the hierarchical tree structures of the multiple assets. For example, the completeness of hierarchical tree structures of FIGS. 6A-B to represent the combined asset formed by joining the first asset (represented by the first hierarchical tree structure of FIG. 4) and the second asset (represented by the second hierarchical tree structure of FIG. 5) may be shown by proving that the hierarchical tree structures of FIGS. 6A-B include (in some implementations, consist of) the leaf nodes of the first and second hierarchical tree structures. In some implementations, such proofs may be in the form of ZKPs that may prove the above-noted fact without disclosing the identities of the leaf nodes (of the first and second hierarchical tree structures, as well as those of FIGS. 6A-B). Accordingly, at 210, a ZKP is generated and sent to a self-executing code segment on the DLN. The self-executing code segment can be, for example, a smart contract on the DLN. The ZKP can include a proof that the leaf nodes of tree structures representing a combined asset (e.g., FIGS. 6A-B) include the leaf nodes of the tree structures of assets (e.g., FIG. 4 and FIG. 5) that were combined to form the combined asset.

At 212, a confirmation is received in response to verification of the ZKP by the self-executing code segment. For example, the self-executing code segment can be a smart contract (e.g., on the DLN) that verifies the ZKP was successfully established by a user. The confirmation can confirm that the combined asset is accurately represented on the DLN by the third token associated with the root node of the third hierarchical tree structure.

Figure 3:
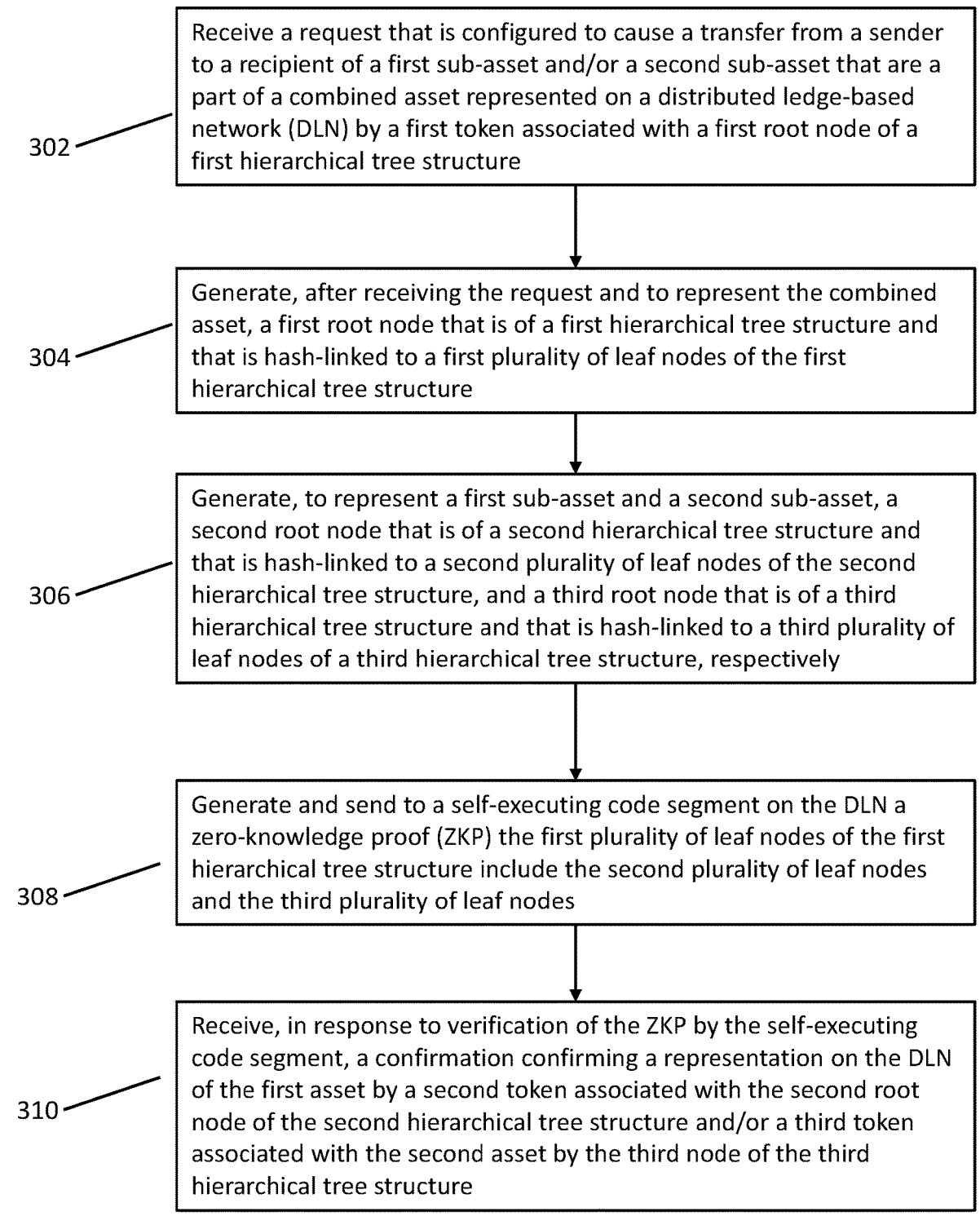
FIG. 3 illustrates a method for verifying the completeness of splits of data object using ZKP proofs, according to an embodiment.

FIG. 3 shows a flowchart illustrating a method for verifying the completeness of splits of data objects, according to an embodiment. The apparatus and methods for splitting a data object (or the related asset token) into two or more data objects (or two or more of the related asset tokens) are described in detail in U.S. patent application Ser. No. 16/542,701, filed on Aug. 16, 2019 and entitled "Methods and Systems for Implementing Zero-Knowledge Proofs in Transferring Partitioned Tokens on Distributed Ledger-Based Networks", which is incorporated herein by reference.

As shown in FIG. 3, at 302, a request is received. The request is configured to cause a transfer from a sender to a recipient of one or more sub-assets that are part of a combined asset that is represented on a DLN by a first token associated with a first root node of a first hierarchical tree structure. For example, the first sub-asset of the one or more sub-assets can be the vehicle engine 112b, the second sub-asset of the one or more sub-assets can be the vehicle chassis 112a and the combined asset can be vehicle 114 as described above in connection with FIG. 1A. In response to the request, at 304, a first root node of a first hierarchical tree structure is generated. The first root node represents the combined asset and is hash-linked to at least one leaf node of the first hierarchical tree structure. In some implementations, the first root node is hash-lined to each and every one of the leaf nodes of the first hierarchical tree structure. FIG. 6A illustrates an example of such a first hierarchical tree structure that represents the combined asset as represented by child nodes A-H. The combined asset can be, for example, a vehicle such as vehicle 114 discussed above in connection with FIG. 1A. Following the example of FIG. 6A, the first root node 601a is hash-linked to child nodes 611a and 612a; in turn, child node 611a is hash-linked to child nodes 621a and 622a, and child node 612a is hash-linked to child nodes 623a and 624a. Child node 621a is hash-linked to leaf nodes 631a and 632a; child node 622a is hash-linked to leaf nodes 633a and 634a; child node 623a is hash-linked to leaf nodes 635a and 636a; child node 624a is hash-linked to leaf nodes 637a and 638a. Similar to the discussion above with respect to FIG. 2, each node within the first hierarchical tree structure can contain, for example, data items that represent the attributes relevant to that node and a hash value of each connected child node within the first hierarchical tree structure. The root node of the first hierarchical tree structure can also include such data items and a hash value of each connected child node within the first hierarchical tree structure, but the root node can also include the result of a combination operator of the hashes of the child nodes within the first hierarchical tree structure (i.e., all leaf nodes within the first hierarchical tree structure). An example of a combination operator $\oplus$ is a concatenation operator |.

At 306, a second root node of a second hierarchical tree structure and a third root node of a third hierarchical tree structure are generated. FIGS. 4 and 5 illustrate examples of such a second hierarchical tree structure and a third hierarchical tree structure, respectively that represents the first sub-asset as represented by leaf nodes A-D and a second sub-asset as represented by leaf nodes E-H, respectively. The second root node (i.e., the root node of the second hierarchical tree structure) represents a first sub-asset of the combined asset and is hash-linked to at least one leaf node of the second hierarchical tree structure. In some implementations, the second root node is hash-linked to only and all of the leaf nodes of the second hierarchical tree structure. Following the example of FIG. 4, the second root node 401 is hash-linked to child nodes 411 and 412; in turn, child node 411 is hash-linked to leaf nodes 421 and 422, and child node 412 is hash-linked to leaf nodes 423 and 424. The third root node (i.e., the root node of the third hierarchical tree structure) represents a second sub-asset of the combined asset and is hash-linked to at least one leaf node of the third hierarchical tree structure. In some implementations, the third root node is hash-linked to only and all of the leaf nodes of the third hierarchical tree structure. Following the example of FIG. 5, the third root node 501 is hash-linked to child nodes 511 and 512; in turn, child node 511 is hash-linked to leaf nodes 521 and 522, and child node 512 is hash-linked to leaf nodes 523 and 524. For example, the first sub-asset can be the vehicle chassis 112*a* and the second sub-asset can be the vehicle engine 112*b* discussed above in connection with FIG. 1A.

The completeness of hierarchical tree structures that represent on a DLN multiple sub-assets (e.g., a first sub-asset and a second sub-asset) that are formed by splitting a combined asset may be shown by proving that the first hierarchical tree structure of the combined asset includes all the leaf nodes of the hierarchical tree structures of the multiple sub-assets. For example, the completeness of the second hierarchical tree structure of FIG. 4 (representing the first sub-asset formed by splitting the combined asset into the first sub-asset and the second sub-asset) and the completeness of the third hierarchical tree structure of FIG. 5 (representing the second sub-asset formed also by splitting the combined asset) may be shown by proving that the first hierarchical tree structures of FIGS. 6A-B include (in some implementations, consist of) the leaf nodes of the second and third hierarchical tree structures. In some implementations, such proofs may be in the form of ZKPs that may prove the above-noted fact without disclosing the identities of the leaf nodes (of the first, second or third hierarchical tree structures). Accordingly, at 308, a ZKP is generated and sent to a self-executing code segment on the DLN. The self-executing code segment can be, for example, a smart contract on the DLN. The ZKP can include the proof that the leaf nodes of the first hierarchical tree structure of the combined asset (i.e., the leaf nodes of FIG. 6A or 6B) include the leaf nodes of the second hierarchical tree structure (i.e., FIG. 4) and the third hierarchical tree structure (e.g., FIG. 5).

At 310, a confirmation is received in response to verification of the ZKP by the self-executing code segment. For example, the self-executing code segment can be a smart contract (e.g., on the DLN) that verifies the ZKP was successfully established by a user. The confirmation can confirm that the split sub-asset(s) is accurately represented on the DLN by a second token associated with the second root node of the second hierarchical tree structure and/or a third token associated with the third root node of the third hierarchical tree structure.

As discussed above, in some embodiments, zero knowledge proofs (ZKPs) can be used to verify the completeness of data objects or asset tokens that were split or joined. Further, ZKPs (e.g., zero knowledge, succinct, non-interacting arguments of knowledge (zk-snarks)) can be used to facilitate the transfer of the joined or split asset tokens. For example, ZKPs can be used to verify the truthfulness of certain statements during transactions on a DLN without revealing information underlying the statements to third parties. For instance, the statement may be related to what an asset token that is being transferred from one party to another represents, and the concealed information may include information about the asset token such as any identifying information of the transaction participants, any identifying information of the physical asset the asset token represents, etc.

While various embodiments have been described and illustrated herein, one will readily envision a variety of other means and/or structures for performing the function and/or obtaining the results and/or one or more of the advantages described herein, and each of such variations and/or modifications is deemed to be within the scope of the embodiments described herein. More generally, one will readily appreciate that all parameters, dimensions, materials, and configurations described herein are meant to be exemplary and that the actual parameters, dimensions, materials, and/or configurations will depend upon the specific application or applications for which the teachings is/are used. One will recognize, or be able to ascertain using no more than routine experimentation, many equivalents to the specific embodiments described herein. It is, therefore, to be understood that the foregoing embodiments are presented by way of example only and that, within the scope of the disclosure, including the appended claims and equivalents thereto, disclosed embodiments may be practiced otherwise than as specifically described and claimed. Embodiments of the present disclosure are directed to each individual feature, system, tool, element, component, and/or method described herein. In addition, any combination of two or more such features, systems, articles, elements, components, and/or methods, if such features, systems, articles, elements, components, and/or methods are not mutually inconsistent, is included within the scope of the present disclosure.

The above-described embodiments can be implemented in any of numerous ways. For example, embodiments may be implemented using hardware, software or a combination thereof. When implemented in software, the software code can be stored (e.g., on non-transitory memory) and executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, netbook computer, or a tablet computer. Additionally, a computer may be embedded in a device not generally regarded as a computer but with suitable processing capabilities, including a smart phone, smart device, or any other suitable portable or fixed electronic device.

Also, a computer can have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer can receive input information through speech recognition or in other audible format.

Such computers can be interconnected by one or more networks in any suitable form, including a local area network or a wide area network, such as an enterprise network, and intelligent network (IN) or the Internet. Such networks can be based on any suitable technology and can operate according to any suitable protocol and can include wireless networks, wired networks or fiber optic networks.

The various methods or processes outlined herein can be coded as software that is executable on one or more processors that employ any one of a variety of operating systems or platforms. Additionally, such software can be written using any of a number of suitable programming languages and/or programming or scripting tools, and also can be compiled as executable machine language code or intermediate code that is executed on a framework or virtual machine.

In this respect, various disclosed concepts can be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other non-transitory medium or tangible computer storage medium) encoded with one or more programs that, when executed on one or more computers or other processors, perform methods that implement the various embodiments of the disclosure discussed above. The computer readable medium or media can be transportable, such that the program or programs stored thereon can be loaded onto one or more different computers or other processors to implement various aspects of the present disclosure as discussed above.

The terms "program" or "software" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of the present disclosure need not reside on a single computer or processor, but can be distributed in a modular fashion amongst a number of different computers or processors to implement various aspects of the disclosure.

Computer-executable instructions can be in many forms, such as program modules, executed by one or more computers or other devices. Generally, program modules include routines, programs, objects, components, data structures, etc. that perform particular tasks or implement particular abstract data types. Typically the functionality of the program modules can be combined or distributed as desired in various embodiments.

Also, data structures can be stored in computer-readable media in any suitable form. For simplicity of illustration, data structures may be shown to have fields that are related through location in the data structure. Such relationships can likewise be achieved by assigning storage for the fields with locations in a computer-readable medium that convey relationship between the fields. However, any suitable mechanism can be used to establish a relationship between information in fields of a data structure, including through the use of pointers, tags or other mechanisms that establish relationship between data elements.

Also, various concepts can be embodied as one or more methods, of which an example has been provided. The acts performed as part of the method may be ordered in any suitable way. Accordingly, embodiments can be constructed in which acts are performed in an order different than illustrated, which can include performing some acts simultaneously, even though shown as sequential acts in illustrative embodiments. All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in claims, shall have its ordinary meaning as used in the field of patent law.

As used herein, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

All transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A method, comprising:
receiving a request that is configured to cause a transfer of a combined asset from a sender to a recipient, the combined asset including a first physical asset and a second physical asset, the first physical asset and the second physical asset represented on a distributed ledger-based network (DLN) by a first token associated with a first root node of a first hierarchical tree structure and a second token associated with a second root node of a second hierarchical tree structure, respectively,
  the first root node being hash-linked to a first plurality of leaf nodes of the first hierarchical tree structure, and
  the second root node being hash-linked to a second plurality of leaf nodes of the second hierarchical tree structure:
generating, via a processor and after receiving the request, a third root node of a third hierarchical tree structure, the third root node being hash-linked to a third plurality of leaf nodes of the third hierarchical tree structure that includes the first plurality of leaf nodes and the second plurality of leaf nodes;
generating and sending to a self-executing code segment on the DLN, via the processor, an interactive zero-knowledge proof (ZKP) that the third plurality of leaf nodes includes the first plurality of leaf nodes and the second plurality of leaf nodes; and
receiving, in response to verification of the interactive ZKP by the self-executing code segment, a confirmation confirming a representation of the combined asset on the DLN by a third token associated with the third root node of the third hierarchical tree structure, the third token representing one of (1) a mechanical assembly of the first physical asset and the second physical asset or (2) a co-packaging of the first physical asset with the second physical asset.

2. The method of claim 1, wherein generating the third root node of the third hierarchical tree structure includes applying a combination operator to contents of at least two leaf nodes from the third plurality of leaf nodes of the third hierarchical tree.

3. The method of claim 1, wherein generating the third root node of the third hierarchical tree structure includes applying a combination operator to contents of at least two leaf nodes from the third plurality of leaf nodes of the third hierarchical tree, the combination operator including a concatenation operator.

4. The method of claim 1, wherein at least one of the first hierarchical tree structure, the second hierarchical tree structure, or the third hierarchical tree structure is stored off the DLN.

5. The method of claim 1, wherein at least one of the first root node, the second root node, or the third root node includes data representing an attribute of the first physical asset, the second physical asset, or the combined asset, respectively.

6. The method of claim 1, wherein at least one of the interactive ZKP or the verification of the interactive ZKP does not reveal identifying information of at least one of the sender, the recipient, the first physical asset, the second physical asset, the combined asset, the first token, the second token, or the third token.

7. The method of claim 1, wherein at least one of the interactive ZKP or the verification of the interactive ZKP does not reveal contents of at least one of the first plurality of leaf nodes, the second plurality of leaf nodes, or the third plurality of leaf nodes.

8. The method of claim 1, wherein at least one of the first token, the second token, or the third token is a non-fungible token.

9. The method of claim 1, wherein the third plurality of leaf nodes consists of the first plurality of leaf nodes and the second plurality of leaf nodes.

10. The method of claim 1, wherein at least one of the first root node, the second root node, or the third root node is stored in a content-addressed data storage such that a storage location of the at least one of the first root node, the second root node, or the third root node is represented by a hash thereof.

11. The method of claim 1, wherein the self-executing code segment on the DLN is a smart contract, and the confirmation includes an indication that the combined asset is accurately represented on the DLN.

12. A method, comprising:
receiving a request that is configured to cause a transfer of at least one of a first physical sub-asset or a second physical sub-asset from a sender to a recipient, the first physical sub-asset and the second physical sub-asset being part of a combined asset represented on a distributed ledger-based network (DLN) by a first token associated with a first root node of a first hierarchical tree structure, the first root node being hash-linked to a first plurality of leaf nodes of the first hierarchical tree structure;
generating, via a processor and upon receiving the request, a second root node of a second hierarchical tree structure and a third root node of a third hierarchical tree structure, the second root node being hash-linked to a second plurality of leaf nodes of the second hierarchical tree structure and the third root node being hash-linked to a third plurality of leaf nodes of the third hierarchical tree structure, the first plurality of leaf nodes including the second plurality of leaf nodes and the third plurality of leaf nodes;
generating and sending to a self-executing code segment on the DLN, via the processor, an interactive zero-knowledge proof (ZKP) that the first plurality of leaf nodes includes the second plurality of leaf nodes and the third plurality of leaf nodes; and
receiving, upon verification of the interactive ZKP by the self-executing code segment, a confirmation confirming a representation, on the DLN, of at least one of (1) the first physical sub-asset by a second token associated with the second root node of the second hierarchical tree structure, the second token representing a split of the first physical sub-asset from the combined asset or (2) the second physical sub-asset by a third token associated with the third root node of the third hierarchical tree structure, the third token representing a split of the second physical sub-asset from the combined asset.

13. The method of claim 12, wherein generating the second root node of the second hierarchical tree structure includes applying a combination operator to contents of at least two leaf nodes from the second plurality of leaf nodes of the second hierarchical tree.

14. The method of claim 12, wherein generating the second root node of the second hierarchical tree structure includes applying a combination operator to contents of at least two leaf nodes from the second plurality of leaf nodes of the second hierarchical tree, the combination operator including a concatenation operator.

15. The method of claim 12, wherein at least one of the first hierarchical tree structure, the second hierarchical tree structure, or the third hierarchical tree structure is stored off the DLN.

16. The method of claim 12, wherein at least one of the first root node, the second root node, or the third root node includes data representing an attribute of the combined asset, the first physical sub-asset, or the second physical sub-asset, respectively.

17. The method of claim 12, wherein at least one of the interactive ZKP or the verification of the interactive ZKP does not reveal identifying information of at least one of the sender, the recipient, the first physical sub-asset, the second physical sub-asset, the combined asset, the first token, the second token, or the third token.

18. The method of claim 12, wherein at least one of the interactive ZKP or the verification of the interactive ZKP does not reveal contents of at least one of the first plurality of leaf nodes, the second plurality of leaf nodes, or the third plurality of leaf nodes.

19. The method of claim 12, wherein at least one of the first token, the second token, or the third token is a non-fungible token.

20. The method of claim 12, wherein the first plurality of leaf nodes consists of the second plurality of leaf nodes and the third plurality of leaf nodes.

\* \* \* \* \*